I. E. McCRACKEN.
METHOD OF AND MACHINE FOR CUTTING GEARS.
APPLICATION FILED APR. 4, 1913.
1,310,761.
Patented July 22, 1919.
2 SHEETS—SHEET 1.
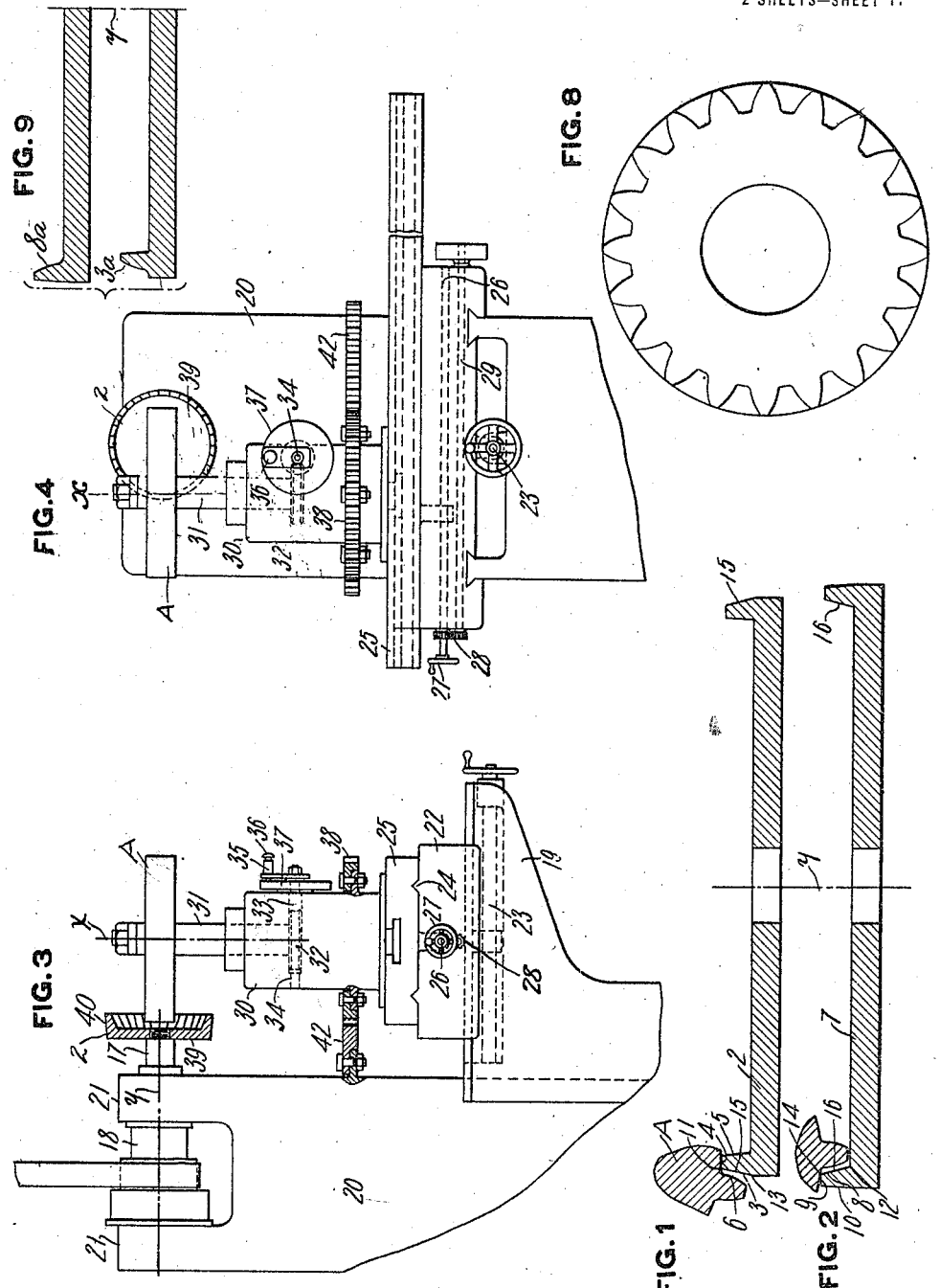
WITNESSES
INVENTOR I. E. McCRACKEN.
METHOD OF AND MACHINE FOR CUTTING GEARS.
APPLICATION FILED APR. 4, 1913.
1,310,761.
Patented July 22, 1919.
2 SHEETS—SHEET 2.
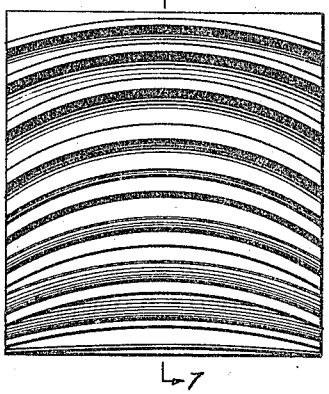
FIG. 6
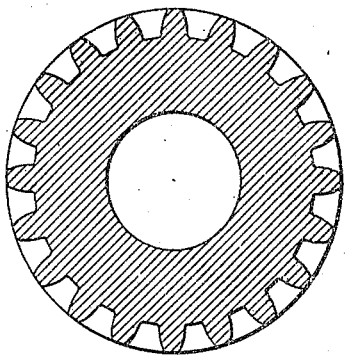
FIG. 7
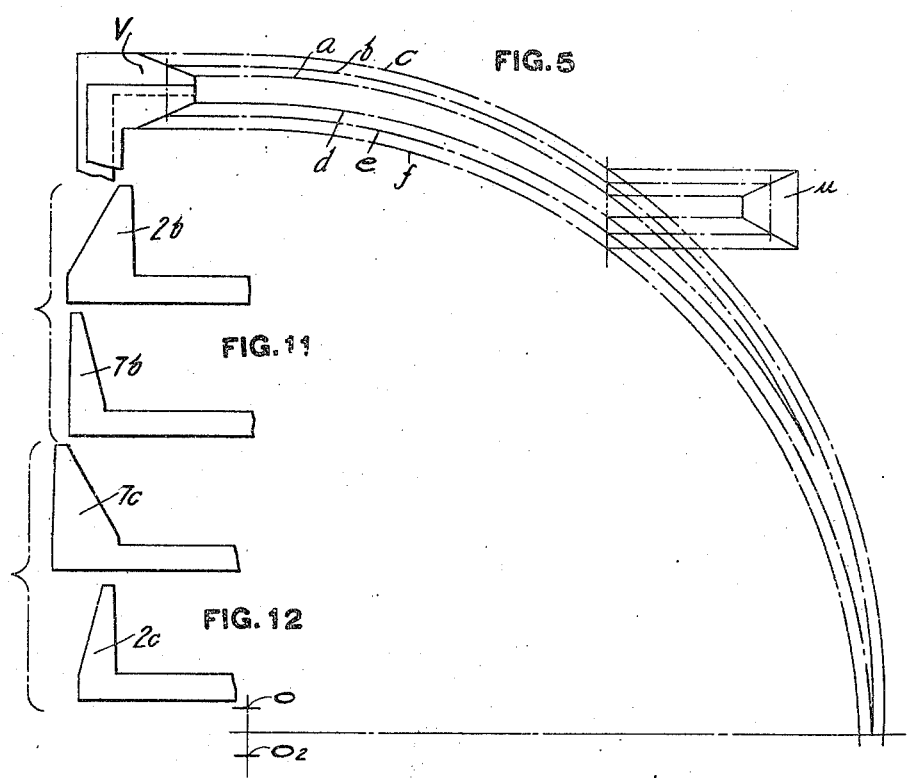
FIG. 5
FIG. 11
FIG. 12
FIG. 10
WITNESSES
INVENTOR

UNITED STATES PATENT OFFICE.

ISAAC E. McCRACKEN, OF PITTSBURGH, PENNSYLVANIA, ASSIGNOR TO GLEASON WORKS, OF ROCHESTER, NEW YORK, A CORPORATION OF NEW YORK.

METHOD OF AND MACHINE FOR CUTTING GEARS.

1,310,761.  Specification of Letters Patent.  Patented July 22, 1919.

Application filed April 4, 1913. Serial No. 758,967.

*To all whom it may concern:*

Be it known that I, ISAAC E. McCRACKEN, a resident of Pittsburgh, in the county of Allegheny and State of Pennsylvania, have invented a new and useful Improvement in Methods of and Machines for Cutting Gears, of which the following is a specification.

This invention relates to a method of cutting gears or pinions, and particularly gears or pinions having teeth of modified herringbone type, that is, where the teeth are curved or deviate circumferentially of the gear, from end to end, from a line parallel with the axis of the gear.

The object of the invention is to provide a method, whereby gears or pinions of the type described can be rapidly and economically manufactured, and whereby the teeth of the gear produced may be formed on true mathematical lines from end to end, so that a pair of gears or pinions will roll truly upon each other. A further object of the invention is to provide a method of cutting gears or pinions, whereby gears or pinions may be produced having teeth of varying shape in cross section from end to end, and specifically where the teeth become gradually thicker at their bases or dedenda and gradually narrower at their apices or addenda, from the median plane of the gear to its end faces, so that the gear tooth is stronger toward its ends than at the middle.

In the drawings, Figure 1 is a diagrammatic view, partly in section, showing the relations between the axes of the blank and the first cutter, during the cutting operation; Fig. 2 is a similar view, illustrating the second cutter; Fig. 3 is a side view of a machine suitable for carrying out the method; Fig. 4 is an end view of the same; Fig. 5 is a diagrammatic view; Fig. 6 represents an elevation of a gear constructed by my improved method; Fig. 7 is a transverse section through the same on the line 7—7, Fig. 6; Fig. 8 is an end elevation of the same; Fig. 9 is a view of a modified pair of cutters; Fig. 10 is a diagrammatic view of a pair of intermeshing buttressed gears; and Figs. 11 and 12 are detail views illustrating the cutters for forming the teeth on the two gears shown in Fig. 10.

For many years attempts have been made to devise some substitute for the ordinary gear or pinion having teeth which are straight and parallel to the axis of the gear and of the same cross section from end to end. In these gears, the end portions are the weakest and the teeth must be made of a cross section from end to end such that the ends of the teeth will stand the greatest duty the gear is required to bear. Some attempts have been made to strengthen the teeth by shrouding, although this expedient can only be adopted completely at both ends of one of the gears or at one end of each gear, or only incompletely at both ends of each gear. Gears with straight teeth also have the objection that the teeth engage with each other along their full length simultaneously, with consequent shock, jar and liability of breakage, and also with an objectionable noise or click. Moreover, the shape of the teeth is such that only one or two teeth on one of the gears can be in contact with the teeth on the other gear at the same time.

The well-known herring-bone gear was devised in an attempt to secure a gear where the teeth mesh or engage gradually or progressively from end to end. In this gear the teeth are inclined spirally in opposite directions from the median plane of the gear, but the gear has the objection that when cut or machined it cannot be formed with teeth which are continuous and of full cross section from end to end. If the gear is made integral, with the teeth inclined spirally in both directions from the median plane, it is necessary in forming a gear to cut out a certain portion of the metal where the oppositely inclined teeth meet end to end in the median plane of the gear, in order to provide clearance for the cutting tool. This can only be obviated by forming the gear in right and left halves rigidly secured together, but the very fact that such gears are not integral, makes them weaker at the median plane where the halves contact.

My invention is designed to overcome all of the defects referred to and to provide a method of cutting gears which will produce a gear having all the advantages of the best herring-bone gears of whatever type, but where, in addition, the teeth have full strength along the median plane, are continuous from end to end of the gear face, are stronger at their ends than in the median plane, and may be successfully and simply cut or machined.

According to my method, the opposite side faces of the teeth, to-wit, the convex and concave sides thereof, are cut at different times, and by different cutters. Referring first to Fig. 3 the blank A to be cut is mounted upon one axis, marked "$x$", and the first cutter, 2, is mounted to rotate about another axis, $y$, which is at right angles to the axis $x$ of the cutter. The first cutter 2 consists of a tooth or teeth, mounted so as to rotate around the axis $y$ and provided with a side cutting edge 3, an edge 4, and a back edge 5. The side cutting edge 3 is on the outer periphery of the tooth 2 with respect to the axis $y$. Cutting edge 3 will be shaped to form the particular type or style of tooth which it is desired to form upon the blank, that is, either an involute or a cycloidal tooth, and in the present instance is shown as being a straight line inclined to the axis $y$ around which the cutter 2 rotates to cut an involute tooth. The extreme end portion and end edge 4 of the cutter form or cut the base of the groove between teeth, while the back edge 5 is located at such a distance from the edge 3 that the total thickness of the cutting tooth is less than the width of the groove to be formed between successive gear teeth. Cutting edge 5 consequently is merely a roughing out edge and is not intended to give shape to the convex side of the tooth next to the tooth being formed.

It is well-known that an ordinary gear or pinion can be formed with involute teeth by means of a longitudinally reciprocating cutter having a cutting tooth or teeth shaped to correspond with the tooth of what is termed "the normal rack", by rolling the blank along said rack cutter in a plane transverse to the direction of reciprocation of the cutter, or, in other words, in the plane of the rack. The same result can be secured by rotating the blank about its axis, reciprocating the cutter longitudinally of the blank axis and simultaneously moving the cutter laterally in a line transverse to the blank axis so that the rolling effect is obtained. The inclination of the side faces or edges of the cutting teeth of the rack cutter determines what is known as the "pressure angle" of the gear, that is, the angle or direction of application of power from one gear to the other. It is also well-known that gear teeth formed by rack tooth cutters having different angles of inclination of their side edges have different shapes. As the angle of inclination of the cutting edge of the tooth becomes greater, the gear tooth produced becomes broader or thicker at its base and narrower at its top, and is considerably stronger since the material is concentrated closer to the axis of the gear.

According to the present invention the blank A and the cutter 2 are mounted with their axes $x$ and $y$, in the relations before described. A rolling motion of the blank with reference to the rotating cutter is then produced in the manner just described so that the blank rolls along or on a plane transverse to the axis of rotation of the cutter and tangent to the pitch line of the gear to be cut. It is, of course, to be understood that the blank and cutter are so positioned that during this rolling movement the rim of the blank will come into cutting range of the cutter. This causes each tooth on cutter 2 to swing across the face of the blank in an arcuate path once at each revolution of the cutter. Preferably, the axis $y$ of the cutter is located to coincide with or lie in the median plane of the gear blank, so that the crest of the curve of the tooth will be in the median plane of the blank, and the tooth will slant or curve off equal amounts toward the opposite ends of the blank. It will of course be understood that the distance of the cutting tooth from axis $y$, that is, the radius of its circle of revolution, cannot be chosen arbitrarily, but in practice must have some relation to the width of the face of the particular blank being cut. The radius of the cutter, of course, determines the amount of curve of the tooth in a blank of given width of face. Practically, however, this radius must be large enough so that the blank can make a complete traverse or rolling movement clear across the path of movement of the cutting tooth on one side of axis $y$ without being contacted by the cutting tooth during its movement in the other direction on the opposite side of axis $y$. Such interference, if it occurred, would damage the already formed tooth. The rolling motion between the blank and cutter may be produced by rotating the cutter about a fixed axis, such as the axis $y$, rotating the blank A about the axis $x$, and moving axis $x$ in a plane transverse to axis $y$ at a rate of speed exactly equal to the rate of rotation of the blank at the pitch line, thereby causing the blank to traverse across the path of movement of the cutter. The same effect may be obtained by rotating the blank on a fixed axis $x$, rotating the cutter upon axis $y$, and moving the axis $y$ parallel to itself and transverse to axis $x$ at a rate of speed equal to the rate of speed of rotation of the blank. When the cutter axis is fixed and the blank axis moves, the rolling motion is like that produced when a gear rolls along a rack, the rack in this case having but a single tooth. Obviously, the same result is produced if the gear axis is fixed and the rack rolls, as it were, around the gear. In other words the same result is produced in the applicant's method if the blank is held stationary on a fixed axis and the cutter is moved around the blank. It is to be understood that any of these motions or any combinations thereof, or of similar motions come within the scope of the present invention, as it is the relative and not the absolute motions between the cutter and blank which are material.

The blank is traversed or rolled across the rotating cutter in the manner described, so that one face, marked "6," and which is the concave side of the tooth, is completely cut or formed from end to end of the tooth.

After the concave face 6 of the tooth is cut, the blank is withdrawn from the working range, is returned to its original position, and in the working range, and is then indexed a distance equal to substantially one-half the circular pitch of the gear, that is, one-half the distance from center to center of consecutive teeth. It is not essential that this distance be exactly one-half the circular pitch. If it is exactly one-half then each tooth will be of exactly the same shape and proportions as the grooves between teeth. If the indexing distance is made slightly more or less than one-half the circular pitch (depending upon which way the blank is turned), the teeth may be made slightly narrower than the grooves. This is sometimes advisable to produce a little clearance, although it is not essential. Cutter 2 is removed and a second cutter, marked "7," Fig. 2, is substituted therefor. Cutter 7 rotates about the same axis y as cutter 2. Cutter 7 is provided with a side cutting edge 8, which is the complement of cutting edge 3. That is, it is of exactly the same shape, but is inclined in the opposite direction from cutting edge 3. It also has an end cutting edge 9 and a back cutting edge 10 which have the same functions as the edges 4 and 5 on cutter 2. Only one of the back cutting edges 5 and 10 comes into action during the formation of a gear, depending upon which cutter is used first. It is an essential feature of the invention that the average radius of the cutting edge 3 on the cutter 2 is exactly equal to the average radius of the cutting edge 8 on cutter 7. That is to say, in the case illustrated, where the cutting edges 3 and 8 are straight, the angles of inclination of said cutting edges are the same, and cutter 2 is of the same depth as cutter 7. Consequently, the point 11, which forms the dedendum of the concave face of the tooth, is at the same distance from the axis y as the point 12 on cutter 7, which forms the addendum on the convex side of the tooth. Likewise, the point 13 on cutter 2, which forms the addendum on the concave face of the tooth, is at the same distance from the axis y as the point 14, which forms the dedendum of the convex side of the tooth. The points 15 and 16 which are respectively located midway between the points 11 and 13 and 12 and 14, are exactly the same distance from axis y. The average radii of the cutting edges on the two cutters 2 and 7 will be the same whatever may be the configuration of the cutters. For example, it is not essential that the cutting edges 3, and 8 be formed on straight lines. They may be curved, as shown at 3ª and 8ª, Fig. 9, depending upon what shape it is desired to give the tooth being formed. Nevertheless, the average radius of the two cutters, referring to the common axis y, will always be the same. Another way of expressing the foregoing is to state that the sum of the radii of the two cutters of a pair, taken at any two corresponding points on the two cutters longitudinally of the axis y, is a constant. This is true even in certain special cases where to get a peculiar shaped tooth one cutter is made longer or deeper than the other.

The second cutter 7 is used in exactly the same manner as cutter 2, by rolling the blank thereacross, it being understood, as stated, that the blank is indexed substantially one-half a tooth between the operations of the two cutters.

In carrying out the invention practically, the teeth may be formed in several different ways. For example, cutter 2 may be used in the manner described to form one face of the tooth. The blank may then be indexed substantially one-half the circular pitch and cutter 7 be used to form the other face of the tooth. Or, cutter 2 may be used to form the concave faces of all of the teeth around the entire circumference of the blank, the latter being indexed or rotated a distance equal to the full circular pitch, between successive complete operations of cutter 2. After the concave faces of all the teeth have been formed by cutter 2, the blank is then indexed substantially one-half the circular pitch and the convex faces of all of the teeth are then formed by successive operations of the cutter 7, the blank being indexed step by step between successive operations.

Figs. 3 and 4 represent a machine suitable for carrying out the invention. As illustrated, this comprises a frame or base 20, having a standard, provided at its upper end with bearings 21 in which rotates an ordinary tool spindle or arbor 17, having a cone belt pulley or like device 18 for rotating the same at varying speeds. Spindle 17 projects endwise from its bearings over a bed 19, and is threaded on its free end to receive and support the cutter. The bed 19 is carried by the frame 20 and is provided on its upper surface with longitudinal ways or V's upon which is adjustably mounted, so as to be movable thereon, a carriage 22. Said carriage may be moved or adjusted along its ways by any ordinary means, such as by a feed screw 23. Carriage 22, upon its upper face, is provided with lateral ways or guides 24 extending in a line transverse to the axis of the spindle or arbor 17, and upon which is adjustably mounted a table or support 25. Said work table or support 25 may be moved or adjusted along the ways 24 by any suitable means, such as the feed screw 26, which may be operated by a hand-wheel 27 or by gearing 28 connecting the feed screw to a driving shaft 29. The shaft 29 is rotatable in bearings in the table 25 and may be driven by any suitable power means, such as by a belt running over the belt pulley shown, or by an electric motor or the like (not shown). Table or support 22 carries a head 30 which is mounted to rotate about a vertical axis, or, in other words, is swiveled to table 25. Said head carries a work arbor 31, the axis of which coincides with the axis about which head 30 is swiveled. The arbor 31 is provided at its lower end with a worm gear 32 meshing with a worm 33 on horizontal shaft 34 in head 30 and by means of which the arbor may be indexed. Preferably, shaft 34 is provided at its outer end with an operating handle 35 of ordinary form and provided with a pin 36 adapted to be engaged in any one of a number of apertures in indexing plate 37, secured to head 30. By rotating the handle 35 and placing the pin 36 successively in the circumferentially spaced apertures in the indexing plate, a blank may be indexed to any distance desired.

Suitable means is also provided for automatically rotating the blank or rolling the same across the cutter during the progress of the cutting action. In the form shown the standard 20 is arranged to support a changeable master rack 42 in such position to be directly under the projecting teeth on the cutter 2. The rotatable head 30 is arranged to carry the rim 38 of a changeable master gear cut to correspond with the size of blank being worked. Obviously, interchangeable racks 42 and gears 38 of different sizes and numbers of teeth may be secured to the bed and rotating table to form different sizes of gears.

In use of the machine the blank A to be worked is rigidly secured to the upwardly projecting end of the arbor 30. Said blank is preferably so disposed that its median horizontal plane is in line with the axis of the tool arbor 17. The first cutter 2 is then secured to the tool arbor 17 in position for the cutting operation. This cutter, in the form shown comprises a milling cutter formed with a circular base or body portion 39, and a rim 40, the rim being provided with a plurality of cutting teeth spaced circumferentially therearound. The cutting edges 3 of said cutting teeth are on the outer periphery with respect to the axis of the arbor 17. A master gear 38 having a pitch diameter corresponding with that of the gear to be cut is secured to the head 30. A rack 42 mating with the gear 38 is secured to base 20. Feed screw 23 is then operated to move the blank into range of the cutter 2 and to engage the master gear with the rack 41. Feed screw 26 is then operated, either automatically or by hand, to move the gear 38 along the rack 42. This causes a rolling motion of the blank A along or on a plane normal to the axis of rotation of the milling cutter 2 and tangent to the pitch line of the gear being cut, thereby generating or forming the concave side of one of the gear teeth. Feed screw 23 is then operated to withdraw the blank from engagement with the cutter, and table 25 is returned to its original position. The blank is then indexed one step and the operation repeated, and so on, all the way around the circumference of the blank. Cutter 2 is then removed and the second cutter 7 substituted therefor. This cutter is a hollow milling cutter with a circular base and rim, like cutter 2, but provided with internal cutting edges. The blank is then indexed substantially one-half the circular pitch and the convex sides of the teeth formed in the same manner as the concave faces are formed with cutter 2.

It will, of course, be understood that all of the movements described may be automatically controlled, by suitable arrangements of the mechanism, so that no hand feeds or indexing movements are necessary.

Fig. 5 represents diagrammatically the path of movement of the cutting edges 3 and 8 of the two cutters to form the tooth being cut. $a$ represents a line generated by the point 11 (Fig. 1) of cutter 2 traveling around the center $o$. $b$ represents the path generated by the point 15 and $c$ the path generated by the point 13. After the concave side of the tooth is cut, the blank is indexed substantially one-half a tooth, changing the relative positions of the blank and cutter so that the convex side of the tooth is generated as if the cutter traveled around the center $o^2$ in the diagram. $d$ represents the path of movement of the point 14 of cutter 7 (Fig. 2), $e$ of the point 16 and $f$ of the point 12. $u$ represents a projection of the path of movement of the cutters on a plane transverse to the axis of the gear, taken at some distance from the median plane of the gear. It will be observed that the angle of inclination to each other of the inclined sides of the figure $u$ is greater than the inclination of said lines in a similar projection taken at the median plane and represented by the two cutters shown in the upper left hand corner of Fig. 5. The figure $u$ is not the actual shape of the cutting teeth, but it is the effective shape of the teeth, due to the positions of the same when they reach the plane where the projection is taken. Consequently, the tooth produced has a greater pressure angle at its ends than at the median plane. This causes a variation in the cross sectional shape of the tooth from end to end.

Fig. 7 represents a section through the gear at its median plane, or at the crests of the curves in the teeth. Fig. 8 represents an end view of the gear, and consequently shows the shape in cross section of the teeth at the ends of the curves therein, or at a point corresponding to projection $u$, Fig. 5. Comparison of Figs. 7 and 8 shows that at their outer ends the teeth are wider and thicker at their bases and narrower at their tops, due to the fact that the cutter swings in an arcuate path across the blank, and the effective angle of its edge with respect to the blank varies or changes as it approaches the ends of the teeth.

There are some special forms of tooth, such as the buttressed tooth shown in Fig. 10, in which the tooth is unsymmetrical, or, in other words its two side faces are not true complements of each other and have different angles of obliquity. In this case the two cutters of a pair will not be complements of each other as above described, but will have different angles of obliquity to the cutter axis to produce the proper tooth curve. Fig. 11 shows the two cutters $2^b$ and $7^b$ for forming the teeth on gear A, cutter $2^b$ for forming the concave side $6^b$ of the tooth and cutter $7^b$ for forming the other or convex side. The cutters for forming the mating gear B will be of the same shape as cutters $2^b$ and $7^b$, but reversed. For example, cutter $2^c$, Fig. 12, forms the concave side of the tooth of gear B and is the complement of cutter $7^b$, while cutter $7^c$, which forms the convex side is the complement of cutter $2^b$. In all four cutters the radius at the pitch line is a constant.

The method described can be carried out economically and successfully and produces gears having curved teeth which mesh or engage progressively from end to end. The teeth are also stronger at their ends, since their cross section varies from the crests of the curves to the ends of the teeth. At the same time the teeth are of true mathematical lines from end to end and therefore roll or mate truly with each other.

What I claim is:—

1. In a machine for cutting curved gear teeth, the combination with a blank carrier, means for imparting a relative rolling motion to the cutter and blank carrier, a cutter having a substantially annular cutting portion, the cutting portion being movable through the blank lengthwise of the tooth to be formed in a path curved in opposite directions around the blank axis, and means for rotating the cutter through the blank during its rolling motion.

2. In a machine for cutting curved teeth on bevel gears, the combination with a blank carrier, of a cutter having a substantially annular cutting portion adapted to move through the blank lengthwise of the tooth to be formed, the axis of the cutter being disposed at an angle to the axis of the blank carrier, adjusting means for changing the position of the blank carrier relatively to the cutter, means for imparting a relative rolling motion to the cutter and blank carrier, and means for rotating the cutter through the blank during said relative rolling motion.

3. In a machine for cutting curved gear teeth, the combination with a blank carrier, means for imparting a relative rolling motion to the cutter and blank carrier, a cutter embodying a rotary support and a plurality of cutting members attached to the support, said cutting members extending from the support in a direction substantially parallel to its axis and movable through the blank lengthwise of the tooth to be formed in a path curved in opposite directions around said axis, and means for rotating the cutter through the blank during said rolling motion.

4. In a machine for cutting curved teeth on bevel gears, a blank carrier, a cutter embodying a rotary support having a plurality of cutting members attached to the support, said cutting members extending from the support in a direction substantially parallel to its axis and movable through the blank lengthwise of the tooth to be formed, the axis of the cutter being disposed at an angle to the axis of the blank carrier, adjusting means for changing the position of the blank carrier relatively to the cutter, means for imparting a relative rolling motion to the cutter and blank carrier, and means for rotating the cutter through the blank during said relative rolling motion.

5. In a machine for cutting curved gear teeth, the combination with a blank carrier, of a cutter having a cutting portion which is movable through the blank lengthwise of the tooth to be formed in a path curved in opposite directions around the blank axis, means for imparting a relative rolling motion to the blank carrier and cutter, and means for advancing the cutter through the blank during said relative rolling motion.

6. In a machine for cutting curved gear teeth, the combination with a blank carrier, of means for imparting a rolling movement to the blank carrier, a cutter having a substantially annular cutting portion movable through the blank lengthwise of the tooth to be formed in a path curved in opposite directions around the blank axis, and means for rotating the cutter through the blank during its rolling motion.

7. In a machine for cutting curved gear teeth on bevel gears, the combination with a blank carrier, of a cutter having a substantially annular cutting portion adapted to move through the blank lengthwise of the tooth to be formed, the axis of the cutter being disposed at an angle to the axis of the blank carrier, adjusting means for changing the position of the blank carrier relatively to the cutter, means for imparting a rolling motion to the blank carrier, and means for rotating the cutter through the blank during said rolling motion.

8. In a machine for cutting curved gear teeth, the combination with a blank carrier, means for imparting a rolling motion to the blank carrier, a cutter embodying a rotary support and a plurality of cutting members attached to the support, said cutting members extending from the support in a direction substantially parallel to its axis and movable through the blank lengthwise of the tooth to be formed in a path curved in opposite directions around said axis, and means for rotating the cutter through the blank during said rolling motion.

9. In a machine for cutting curved teeth on bevel gears, the combination with a blank carrier, of a cutter embodying a rotary support having a plurality of cutting members attached to the support, said cutting members extending from the support in a direction substantially parallel to its axis and movable through the blank lengthwise of the tooth to be formed, the axis of the cutter being disposed at an angle to the axis of the blank carrier, adjusting means for changing the position of the blank carrier relatively to the cutter, means for imparting a rolling motion to the blank carrier, and means for rotating the cutter through the blank during said rolling motion.

10. In a machine for cutting curved gear teeth, the combination with a blank carrier, of a cutter having a cutting portion which is movable through the blank lengthwise of the tooth to be formed in a path curved in opposite directions around the blank axis, means for imparting a rolling motion to the blank carrier, and means for advancing the cutter through the blank during said rolling motion.

11. In a machine for cutting curved teeth on bevel gears, the combination with a blank carrier, of a cutter having a cutting portion which is movable through the blank lengthwise of the tooth to be formed in a path curved in opposite directions around the blank axis, adjusting means for changing the position of the blank carrier relatively to the cutter, means for imparting a rolling motion to the blank carrier, and means for advancing the cutter through the blank during said rolling motion.

12. Method of cutting curved true involute teeth of uniform depth which consists in producing a constrained mutual rolling movement between a straight-flanked tool and the work piece, said rolling movement being effected by rotating said tool about an axis which extends in parallelism with the tool-axis, the circular path of the tool intersecting at one point the periphery of the work piece, while the plane of said path extends in parallelism with that tangent to the work piece which forms a right angle with the axis of rotation of the tool.

13. In a gear-cutting machine, the combination of means for supporting the blank, a cutter, means for operating the cutter across the face of the blank in a path curved in opposite directions circumferentially of the blank, and means for simultaneously rolling the blank on its pitch surface.

14. In a gear cutting machine, the combination with means for supporting the blank, a cutter, and means for rolling the blank relative to the cutter to generate the tooth, of means for operating the cutter across the face of the blank in a path curved in opposite directions circumferentially of the blank, and means for positively holding the blank against all rotation on its axis, except that due to the said rolling means, during the cutting operation.

15. In a gear cutting machine, the combination with means for supporting the blank, a cutter, and means for rolling the blank relative to the cutter to generate the tooth, of means for operating the cutter including guiding means for moving the cutter in a path curved in opposite directions across the face of the blank.

16. In a gear cutting machine, the combination of a device for supporting the blank, a cutter device, means for guiding the cutter device in a path curved in two directions across the face of the blank, and means for moving one of said devices to generate the tooth.

17. In a gear cutting machine, the combination of a device for supporting the blank, a cutter device, means for producing a relative movement between said devices causing the cutter device to travel in a path curved back and forth across the face of the blank, and means for moving one of said devices to generate the tooth.

18. In a gear cutting machine, the combination of a blank support, a cutter, and means for moving the cutter in a curved path across the face of the blank and parallel to a plane tangential to the pitch surface thereof.

19. In a gear cutting machine, the combination of a blank support, a cutter, means for moving the cutter in a curved path across the face of the blank and parallel to a plane tangential to the pitch surface thereof, and means for producing an additional relative movement between said blank and cutter to generate the tooth.

20. In a machine for cutting curved gear teeth, the combination with a blank carrier, of a cutter having a substantially annular cutting portion adapted to move through the blank lengthwise of the tooth to be formed, the axis of the cutter being disposed at an angle to the axis of the blank carrier, adjusting means for changing the position of the blank carrier relatively to the cutter, means for imparting a relative rolling motion to the cutter and blank carrier, and means for rotating the cutter through the blank during said relative rolling motion.

21. In a machine for cutting curved gear teeth, a blank carrier, a cutter embodying a rotary support having a plurality of cutting members attached to the support, said cutting members extending from the support in a direction substantially parallel to its axis and movable through the blank lengthwise of the tooth to be formed, the axis of the cutter being disposed at an angle to the axis of the blank carrier, adjusting means for changing the position of the blank carrier relatively to the cutter, means for imparting a relative rolling motion to the cutter and blank carrier, and means for rotating the cutter through the blank during said relative rolling motion.

22. In a machine for cutting curved gear teeth, the combination with a blank carrier, of a cutter having a substantially annular cutting portion adapted to move through the blank lengthwise of the tooth to be formed, the axis of the cutter being disposed at an angle to the axis of the blank carrier, adjusting means for changing the position of the blank carrier relatively to the cutter, means for imparting a rolling motion to the blank carrier, and means for rotating the cutter through the blank during said rolling motion.

23. In a machine for cutting curved gear teeth, the combination with a blank carrier, of a cutter embodying a rotary support having a plurality of cutting members attached to the support, said cutting members extending from the support in a direction substantially parallel to its axis and movable through the blank lengthwise of the tooth to be formed, the axis of the cutter being disposed at an angle to the axis of the blank carrier, adjusting means for changing the position of the blank carrier relatively to the cutter, means for imparting a rolling motion to the blank carrier, and means for rotating the cutter through the blank during said rolling motion.

24. In a machine for cutting curved gear teeth, the combination with a blank carrier, of a cutter having a cutting portion which is movable through the blank lengthwise of the tooth to be formed in a path portions of which are curved in opposite directions circumferentially of the blank, adjusting means for changing the position of the blank carrier relatively to the cutter, means for imparting a rolling motion to the blank carrier, and means for advancing the cutter through the blank during said rolling motion.

25. A gear cutting machine, comprising a rotatable cutter carrying member, a cutter eccentrically located thereon, and means for producing relative rolling motion between said cutter and a blank along the plane of movement of the cutter.

26. A gear cutting machine, comprising a rotatable cutter carrying member, a cutter eccentrically located thereon, a blank carrying member having its axis normal to the axis of said cutter carrying member, and means for producing relative rolling motion between said blank and cutter along a plane normal to the cutter axis and tangent to the pitch line of the blank.

27. A gear cutting machine, comprising a rotatable cutter carrying member, a cutter eccentrically located thereon, and means for rolling a blank along the plane of rotation of said cutter.

28. A gear cutting machine, comprising a rotatable cutter carrying member, a cutter eccentrically located thereon, means for producing relative rolling movement between said cutter and a blank along the plane of rotation of the cutter, and means for relatively rotating the blank and cutter step by step around the blank axis.

29. A gear cutting machine, comprising a cutter carrying member, a cutter eccentrically located thereon, a work carrying arbor having its axis normal to the axis of said cutter carrying member, and means for rotating said arbor and moving the same in a plane normal to the axis of said cutter carrying member.

30. A gear cutting machine, comprising a support, a spindle journaled therein, a cutter eccentrically mounted on said spindle, a blank carrying member movable in a plane normal to the spindle axis, and means for rotating said blank carrying member as it moves past said spindle.

31. A gear cutting machine, comprising a support, a spindle journaled therein, a cutter eccentrically mounted on said spindle, a blank carrying member movable in a plane normal to the spindle axis, and connections between said blank carrying member and support for rotating the blank as it travels across the cutter.

32. In a gear cutting machine, the combination of a device for supporting the blank, a cutter device, means for guiding the cutter device in a curved path across the face of the blank, and means for moving one only of said devices to generate the tooth.

33. In a gear cutting machine, the combination of a device for supporting the blank, a cutter device, means for producing a relative movement between said devices causing the cutter device to travel in a curved path across the face of the blank, and means for moving one only of said devices to generate the tooth.

34. A gear cutting machine comprising a support, a cutter carrying member rotatable therein, a cutter eccentrically mounted on said member, a rack on said support, a blank carrying member, a gear carried thereby and arranged to mesh with said rack, and means for producing relative rolling motion between said gear and rack to traverse the blank past the cutter.

35. A gear cutting machine comprising a support, a cutter carrying member rotatable therein, a cutter eccentrically mounted on said member, a blank carrying member movable on said support to traverse the blank past the cutter, and rack and gear connections between said blank carrying member and support for rotating the blank as it travels past the cutter.

36. In a gear-cutting machine, the combination with means for rotatively supporting a gear blank, and a cutting tool adapted to operate upon the said blank, of automatic means for moving the said cutting tool in a curved path around an axis lying in a plane substantially perpendicular to the axis of rotation of the said blank and for imparting a tooth-generating movement to the said blank.

37. In a gear-cutting machine, the combination with means for rotatively supporting a gear blank, and a cutting tool adapted to operate upon the said blank, of automatic means for moving the said cutting tool in a curved path around an axis lying substantially in the median plane of the said gear blank, and for imparting a tooth-generating movement to the said blank.

38. In a gear-cutting machine, the combination with means for rotatively supporting a gear blank, and a rotary cutting tool adapted to operate upon the said blank, of automatic means for rotating the said cutting tool about an axis lying in a plane substantially perpendicular to the axis of rotation of the said gear blank and for imparting a tooth-generating movement to the said blank.

39. In a gear-cutting machine, the combination with means for rotatively supporting a gear blank, and a rotary cutting tool adapted to operate upon the said blank, of automatic means for rotating the said cutting tool about an axis lying substantially in the median plane of said blank, and for imparting a tooth-generating movement to the said blank.

40. In a gear-cutting machine, the combination with means for rotatively supporting a gear blank, of a plurality of cutting tools for operating upon the said gear blank, the said tools being equidistant from and adapted to rotate about an axis lying in a plane substantially perpendicular to the axis of rotation of the said gear blank, and means for automatically rotating the said gear blank, and the said cutting blades about their respective axes and for simultaneously imparting a tooth-generating movement to the said blank.

41. In a gear-cutting machine, the combination with means for rotatively supporting a gear blank, of a hollow milling tool adapted to operate upon the said gear blank, the said milling tool being adapted to rotate about an axis lying substantially in the median plane of the said gear blank, and means for automatically rotating the said milling tool about its axis and for simultaneously imparting a tooth-generating movement to the said blank.

42. A gear-cutting machine comprising automatic means for effecting cutting engagement between a gear blank and a rotary cutting tool moving in a non-rectilinear path, and for imparting a relative rolling movement to the said blank and the said cutting tool.

43. A gear-cutting machine comprising means for rotatively supporting a gear blank, a hollow milling tool, and automatic means for effecting cutting engagement between the said tool and the said blank and for imparting a relative rolling movement to the said blank and the said cutting tool.

44. A gear-cutting machine comprising means for rotatively supporting a gear blank, a hollow milling tool, and automatic means for effecting cutting engagement between the said blank and the said cutting tool, for effecting relative bodily movement between the said blank and the said tool and for simultaneously rotating the said blank.

45. A gear-cutting machine comprising means for rotatively supporting a gear blank, a hollow milling tool adapted to move in a non-rectilinear path, automatic means for effecting cutting engagement between the said gear blank and the said cutting tool, and automatic means for effecting relative bodily movement between the said blank and the said tool and for simultaneously rotating the said blank.

46. A gear-cutting machine comprising means for rotatively supporting a gear blank, a hollow milling tool adapted to move in a curved path, and automatic means for effecting cutting engagement between the said blank and the said tool, for effecting relative bodily movement between the said blank and the said tool and for simultaneously rotating the said blank.

47. A gear-cutting machine comprising means for rotatively supporting a gear blank, a hollow milling tool adapted to move in a non-rectilinear path, and automatic means for effecting cutting engagement between the said gear blank and the said cutting tool, for effecting relative bodily movement between the said blank and the said tool while they are in engagement and for simultaneously rotating the said blank to maintain the same peripheral portion of the said blank in engagement with the said cutting tool during the said relative bodily movement.

48. A gear-cutting machine comprising means for rotatively supporting a gear blank, a hollow milling tool, and automatic means for effecting cutting engagement between the said gear blank and the said milling tool, for effecting relative bodily movement between the said blank and the said tool while they are in engagement and for simultaneously rotating the said blank to maintain the same peripheral portion of said blank in engagement with the said hollow milling tool during the said relative bodily movement.

49. A gear-cutting machine comprising means for rotatively supporting a gear-blank, a rotary cutting tool and automatic means for effecting cutting engagement between the said blank and the said tool, for effecting relative bodily movement between the said blank and the said tool while they are in engagement and for simultaneously rotating the said blank at a speed, measured upon its pitch circumference, equal to the speed of the said relative bodily movement, whereby the same peripheral portion of the said blank is maintained in engagement with the said tool during the said relative bodily movement.

50. A gear-cutting machine comprising means for rotatively supporting a gear blank, a hollow milling tool, and automatic means for effecting cutting engagement between the said blank and the said tool, for effecting relative bodily movement between the said blank and the said tool while they are in engagement, and for simultaneously rotating the said blank at a speed, measured upon its pitch circumference, equal to the speed of the said relative bodily movement, whereby the said peripheral portion of the said blank is maintained in engagement with the said tool during the said relative bodily movement.

51. A gear-cutting machine comprising means for rotatively supporting a gear blank, a rotary cutting tool and automatic means for effecting cutting engagement between the said blank and the said tool and for imparting a cycloidal motion, relative to the active path of the said tool, to the portion of the gear blank that is in engagement with the said tool.

52. A gear-cutting machine comprising means for rotatively supporting a gear blank, a hollow milling tool, and automatic means for effecting cutting engagement between the said blank and the said milling tool and for imparting a cycloidal motion, relative to the active path of the said milling tool, to the portion of the gear blank that is in engagement with the said milling tool.

53. A gear-cutting machine comprising means for associating a gear blank with a rotary cutting tool and for imparting a four-way movement to one of the said members, whereby the portion of the gear blank to be cut is first caused to occupy the plane of rotation of the said cutting tool, then brought into engagement with the said tool, then caused to be separated from the said plane of rotation, and finally restored to its original position with relation to the said cutting tool.

54. A gear-cutting machine comprising means for associating a gear blank with a rotary cutting tool and for imparting a four-way movement to one of the said members, whereby the portion of the gear blank to be cut is first caused to occupy the plane of rotation of the said cutting tool, then brought into engagement with the said tool, then caused to be separated from the said plane of rotation, and finally restored to its original position with relation to the said cutting tool, and means for rotating said blank during its engagement with the said cutting tool to maintain the same peripheral portion of the blank in engagement with the said tool.

In testimony whereof I have hereunto set my hand.

ISAAC E. McCRACKEN.

Witnesses:
 ELBERT L. HYDE,
 JOHN W. TODD.